Sept. 11, 1923.  
H. A. BENEDICT ET AL  
ELECTRIC CIRCUIT CONTROL APPARATUS  
Filed June 14, 1922 5 Sheets-Sheet 2

INVENTORS:  
Hershel A. Benedict  
and Edvard M Moller  
By  
*Mason Fenwick & Lawrence*  
ATTORNEYS

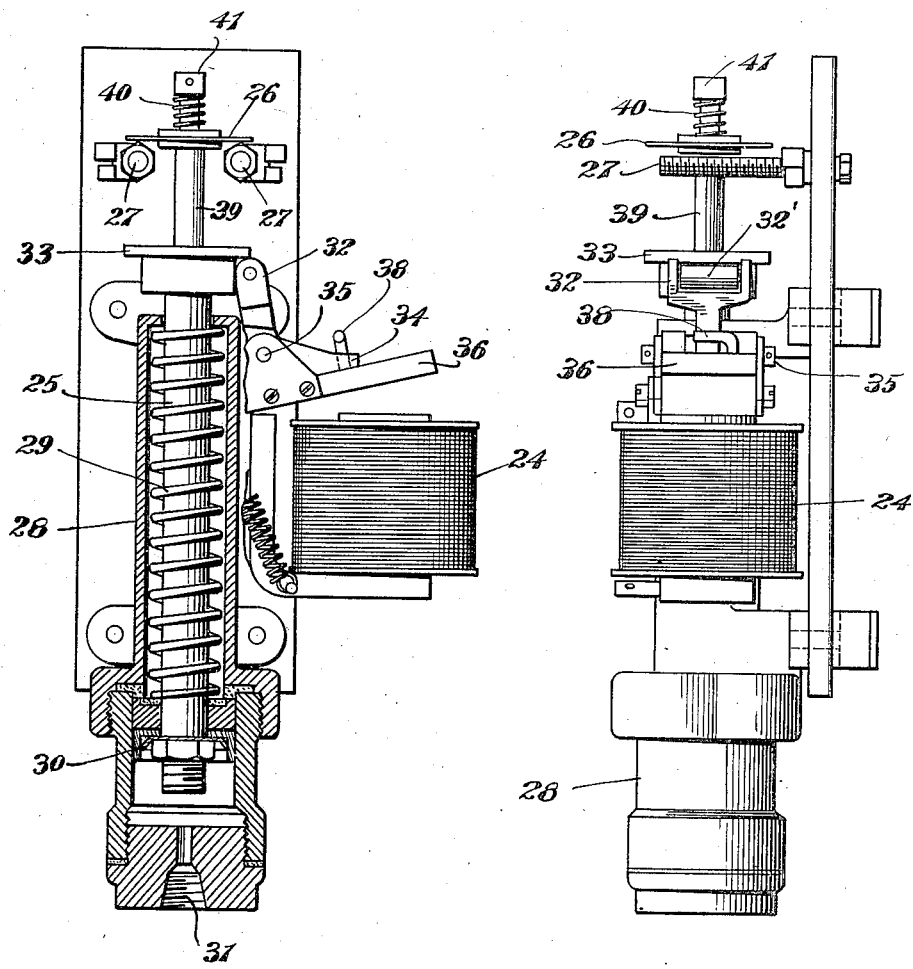

Sept. 11, 1923.

H. A. BENEDICT ET AL 1,467,748

ELECTRIC CIRCUIT CONTROL APPARATUS

Filed June 14, 1922  5 Sheets-Sheet 4

INVENTORS
Hershel A. Benedict
and Edvard M. Moller
BY
ATTORNEYS

Inventors
Hershel A. Benedict
and Edvard M. Moller.

Patented Sept. 11, 1923.

1,467,748

UNITED STATES PATENT OFFICE.

HERSHEL A. BENEDICT, OF EAST ORANGE, AND EDVARD M. MOLLER, OF JERSEY CITY, NEW JERSEY.

ELECTRIC-CIRCUIT-CONTROL APPARATUS.

Application filed June 14, 1922. Serial No. 563,353.

*To all whom it may concern:*

Be it known that we, HERSHEL A. BENEDICT and EDVARD M. MOLLER, citizens of the United States, residing at East Orange and Jersey City, in the counties of Essex and Hudson and State of New Jersey, have invented certain new and useful Improvements in Electric-Circuit-Control Apparatus; and we do hereby declare the following to be a full, clear, and exact description of the invention, such as will enable others skilled in the art to which it appertains to make and use the same.

The objects of this invention are to provide means for automatically shutting off the current upon application of the brakes; to prevent the current from being again applied until the brakes are released; to provide for automatically permitting the current to be turned on upon release of the brakes; to provide a circuit breaker for this purpose which may be automatically opened and closed; to provide means for opening the circuit breaker upon application of the brakes, and means for closing the circuit breaker when the brakes are released and the control is operated for supplying current to the motor; to include in the circuit an overload relay; to operate the same circuit breaker with the overload relay; to provide separate means for closing circuit breaker when opened by the relay; to secure simplicity of construction and operation and to obtain other advantages and results as may be brought out in the following description.

Referring to the accompanying drawings in which like numerals of reference indicate similar parts throughout the several views;

Figure 5 is a view similar to Fig. 2, broken away to show the interior construction of the cylinder;

Figure 6 is an edge view looking at the right hand side of Fig. 2;

Figure 1:
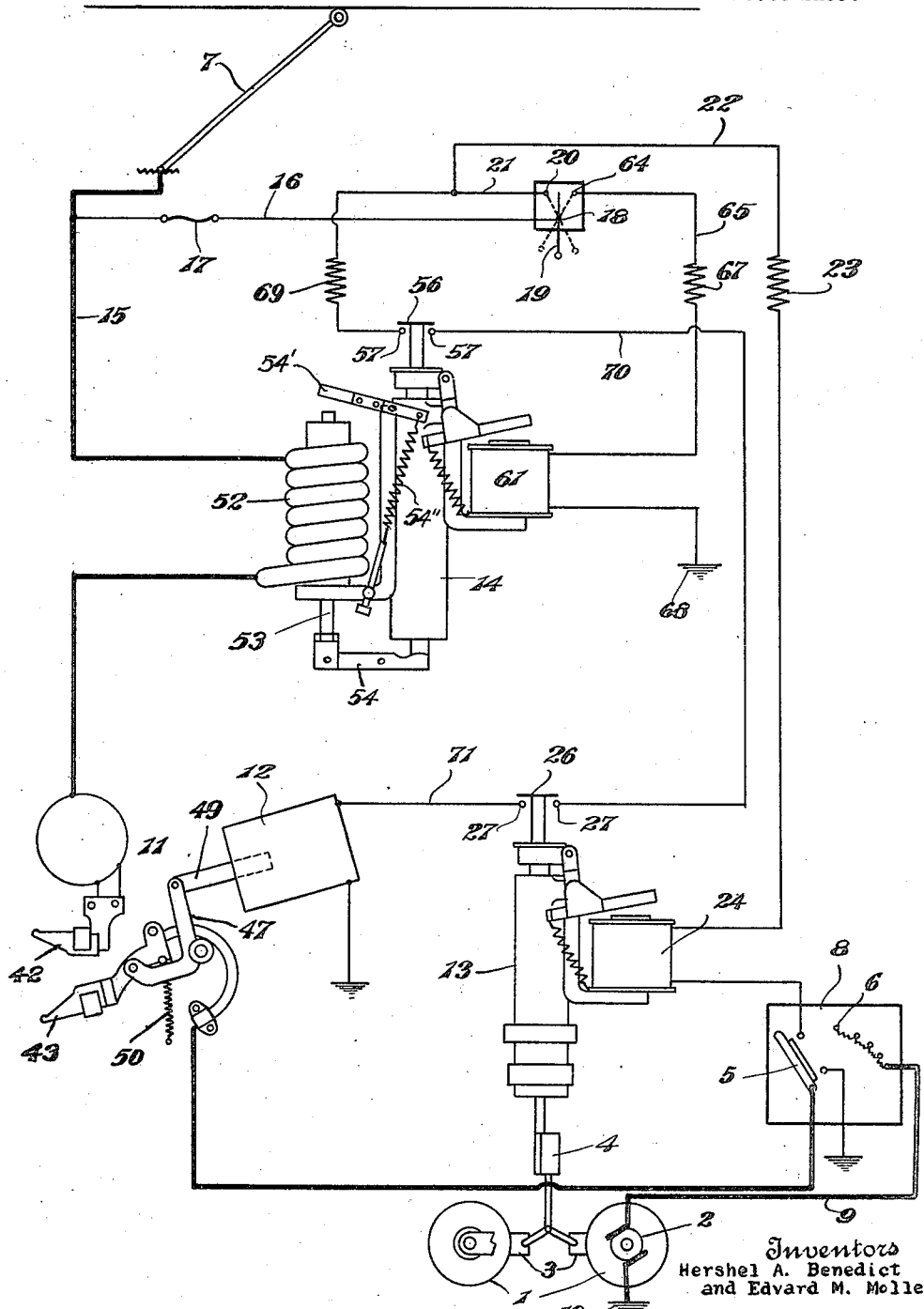
Figure 1 is a diagrammatic view of the entire apparatus and connections.
Figure 2:
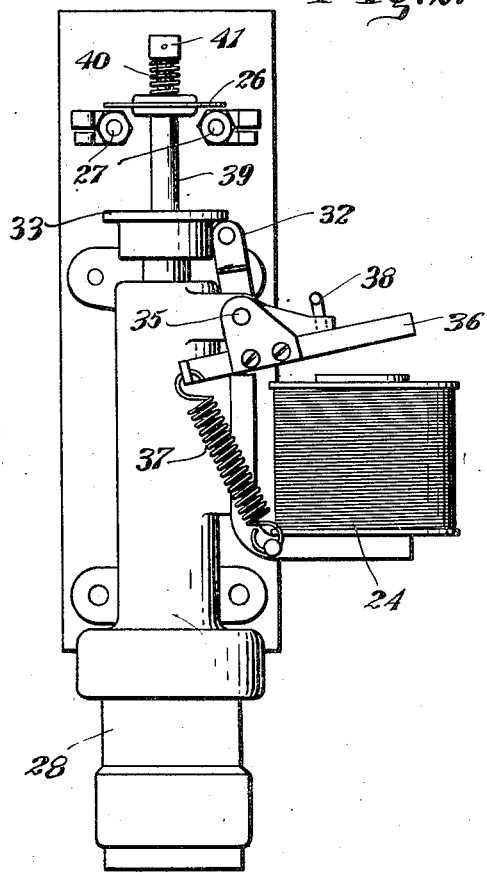
Figures 2, 3 and 4 are similar side elevations of the pneumatic relay showing the same in open, closing and closed positions respectively.
Figure 3:
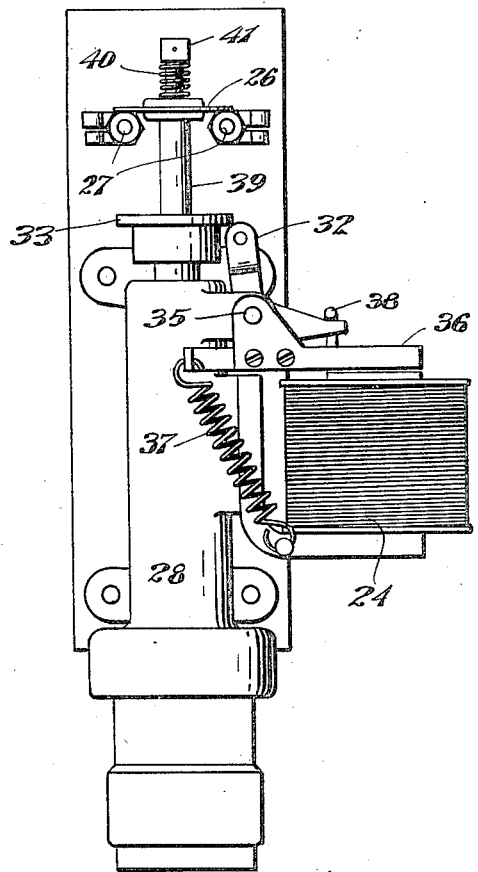

In the specific embodiment of the invention illustrated in said drawings, referring particularly to Figure 1, the reference numeral 1 indicates diagrammatically the wheels of a trolley car or other vehicle having a driving motor 2 and pneumatically operated brakes 3. It is to be understood that brakes 3 are applied by admitting air pressure into a suitable brake cylinder 4. Also, the motor 2 is under control of the operator by means of a control handle 5 which, when operated, will connect any one of a plurality of points 6, so that current may pass from the trolley pole or other plow 7 through the connection therefrom to the control 8 and points 6 through suitable conductors 9 to the motor and the ground as indicated at 10.

In the circuit, preferably between the trolley pole or plow 7 and the control 8, is a circuit breaker 11, which, when open as shown in Figure 1 will interrupt passage of current to the motor and prevent the same from being started until the circuit breaker is closed. In general, the circuit breaker is arranged to open unless positively held closed by passage of current through a holding coil 12. Therefore, immediately upon interruption of the circuit of the holding coil 12 the circuit breaker 11 will open and interrupt the main line current to the motor. We provide two points at which the holding coil circuit may be interrupted, once by the application of the brakes, that is, by a pneumatic relay 13, or secondly by an overload of current in the main line which operates an overload relay 14 to interrupt the holding coil circuit. It is to be observed that the holding coil circuit is tapped in from the main line 15 at a point between the trolley pole or plow and the circuit breaker by wire 16 protected by fuse 17. This wire 16 leads to the pivot 18 of a reset lever 19. In normal position of said lever 19, contact is made with a switch point 20 connected by wire 21 to a branch wire 22, which is connected in series with suitable resistance 23 and a magnet 24 forming a part of the pneumatic relay 13. By this means, the current is shunted from the main line and passed through magnet 24. It will be observed, however, that current is flowing through this magnet 24, only upon closing a switch which preferably forms a part of the control 8. It is preferred that turning the control handle 5 to the first point will close the circuit from the magnet 24 to the ground and turning the control handle 5 to the next point will open said circuit but will then close the main line circuit for connecting the current to the motor. Upon closing the circuit of the magnet 24, assuming the brakes to have been released, the circuit to the circuit breaker holding magnet 12 is closed, thus causing the circuit breaker to close and complete the main line circuit so that as the control handle is swung to the second point the circuit to the motor is completed.

Figure 4:
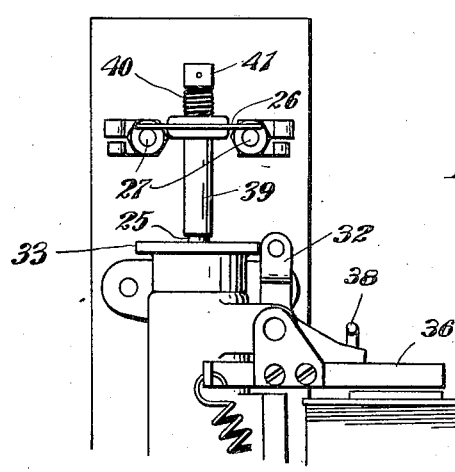

The pneumatic relay 13 includes a plunger 25 near the upper end of which is connected a transverse switch plate 26. Projecting beneath the switch plate, but insulated from each other are a pair of contact points 27 against both of which the switch plate will engage when the plunger is down. These contact points and switch plate form a part of the holding magnet circuit of the circuit breaker. It will therefore be seen that when the plunger 25 is raised, the circuit breaker holding magnet circuit is broken which results in the circuit breaker opening the main circuit. As soon as the switch plate 26 is lowered to connect the contact points 27, the holding magnet circuit of the circuit breaker is closed and thereupon the circuit breaker closes the main line circuit. Plunger 25 passes through a suitable cylinder 28 in which is mounted a spring 29 normally pressing the plunger downwardly for maintaining the switch plate in engagement with the contact points. The lower end of the cylinder 28 contains a plunger head 30, and is connected there beneath, as by tapped opening 31, to the brake cylinder 4. Upon introduction of air pressure in the brake cylinder, a portion of the pressure is communicated to the relay cylinder 28 beneath a plunger head 30 and thereupon elevates the plunger 25 and disconnects the contact points. As soon as the plunger 25 comes to its elevated position, there is a pivoted detent 32 with a roller 32' which engages beneath a collar 33 and retains the plunger in elevated position. This detent 32 is bell crank shaped thereby having a laterally projecting arm 34. Pivoted for convenience on the same pivot 35 with the bell crank detent is an armature 36 overlying the core of magnet 24 of the relay. This armature 36 is provided with a spring 37 which normally holds the armature raised and the parts are so arranged that the armature 36 in swinging to its elevated position will press against arm 34 of the bell crank lever and tend to press the upper end or arm 32 beneath collar 33. Armature 36 is furthermore provided with a finger 38 which overlies arm 34 so as to engage the same as the armature swings to its lower position. This enables the armature to have a degree of movement as it swings down prior to engagement with the arm 34 and the momentum of the armature will therefore strike a blow on the arm 34 sufficient to snap the arm 32 out from under the collar 33. It will be observed that the armature 36 is actuated by the magnet 24 when the current passes through the magnet upon closing the contact points in the control as the control arm is swung to the first point. When this occurs, if the pressure has been released beneath the plunger head 30, spring 29 will thereupon operate to depress the plunger and close the circuit to the holding coil of the circuit breaker. Of course if the pressure has not been relieved, the detent may be swung, but the plunger will not depress and therefore the circuit breaker will not close so that continued operating of the control handle will not result in supplying any current to the motor. It may be here noted that the switch plate 26 is carried on a sleeve 39 suitably mounted on the upper end of plunger 25. The sleeve 39 is normally held in its lowest position by means of a small spring 40 between the end of the sleeve and a suitable cap 41 on the end of the plunger 25. This structure permits a positive contact of the switch plate with the contact points 27 without injury to any of the parts due to the greater strength of the operating spring 29 within the cylinder. When the plunger is lowered, as shown in Figure 4, it will be observed that the plunger may have a greater movement than is necessary to acutally close the circuit between the contact points 27 without injury to any of the parts.

Figure 7:
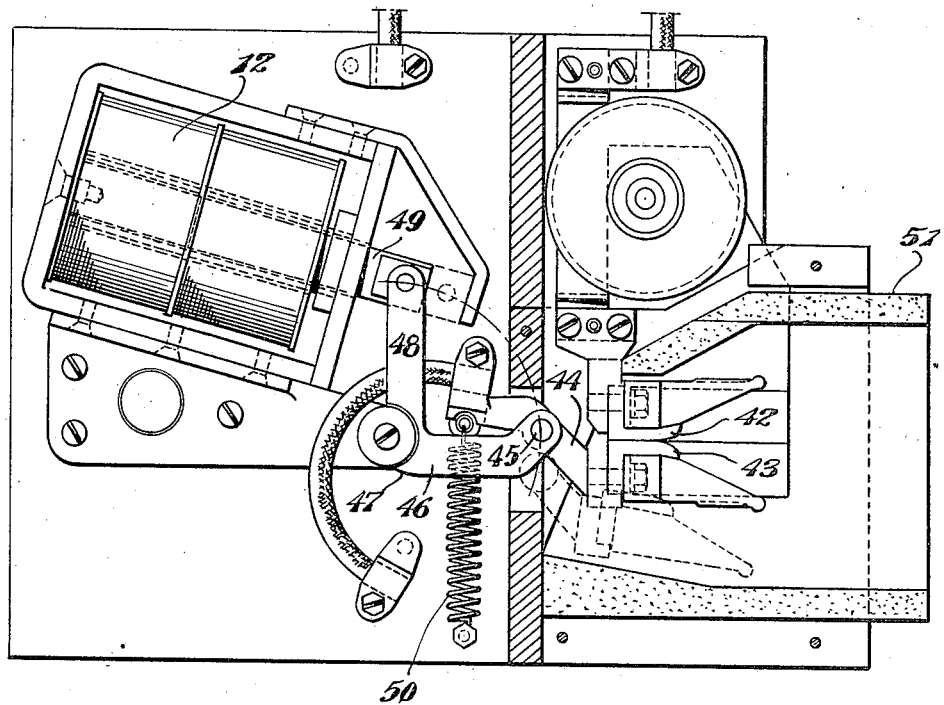
Figure 7 is a plan view of the circuit breaker.
Figure 8:
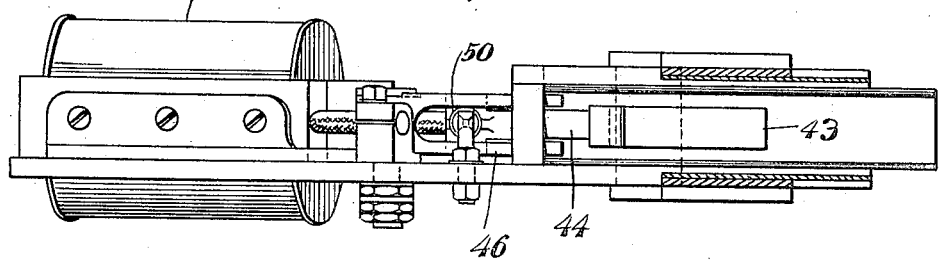
Figure 8 is an edge view of the same viewed from the bottom of Fig. 7.

As shown more clearly in Figures 7 and 8, the circuit breaker 11 includes a fixed contact member 42 and a movable contact member 43. This movable member 43 is mounted upon an arm 44 pivoted as at 45 to one arm 46 of a bell crank lever 47, the other arm 48 of which is connected to the end of a core or armature 49. The arm 44 carrying a movable contact member 43 at one end extends beyond the pivotal support 45 and at that extended end has a spring 50 attached thereto which tends to swing the contact member 43 upwardly toward the fixed member 42. Therefore, as the bell crank lever 47 is swung in a direction to open the contact member, the members will first slide against each other rather than immediately spreading apart, thus giving a wiping action which is important to prevent an excessive arc. The contact members are preferably positioned within a suitable housing 51 which protects the arc from doing any damage. As indicated above, the contact members 42 and 43 are opened by spring 50, and are closed by a magnet or solenoid, heretofore indicated by reference numeral 12.

Figure 10:
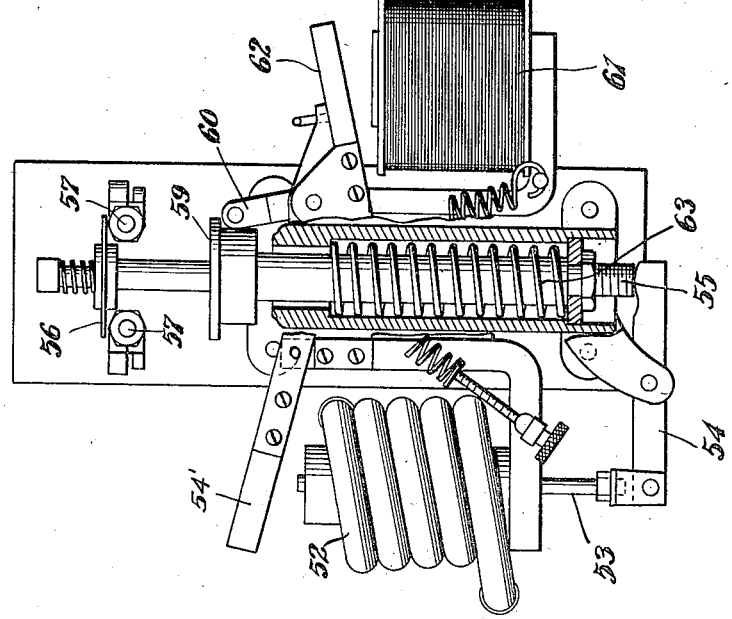
Figure 10 is a similar view showing the cylinder in section for disclosing the entire structure thereof.
Figure 9:
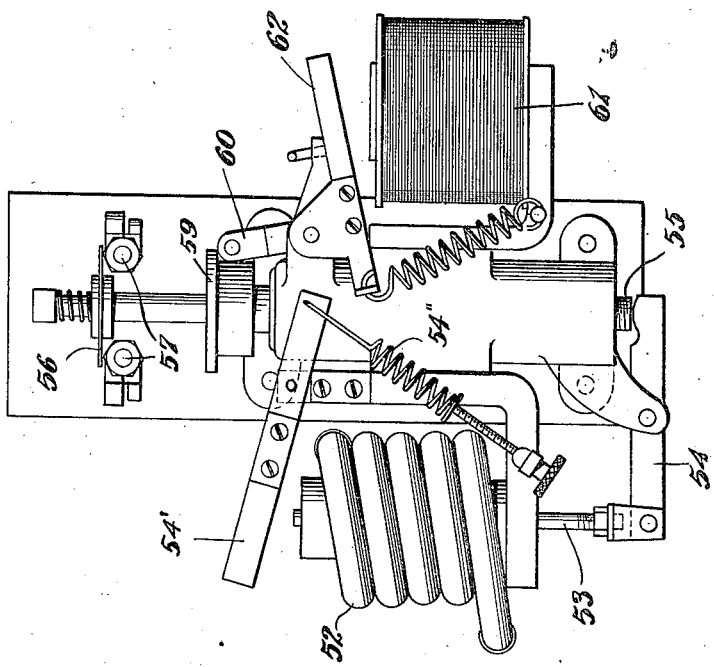
Figure 9 is an elevation of the overload relay showing the circuit breaker.

It is desirable that the same circuit breaker may be utilized to break the main line circuit as the result of an overload, and to this end we provide the overload relay 14. This overload relay as clearly shown in Figures 9 and 10 includes a magnet or coil 52 through which the main line current passes in going from the trolley pole or plow to the circuit breaker. Passing through this coil 52 is a fixed hollow core through which passes a brass or other rod 53 pivoted at one end to a first-class lever 54 the other end of which engages the lower end of a plunger 55 similar to the plunger 25 of the pneumatic relay with the exception that there is no plunger head or air connection. At the opposite end of the coil 52 from lever 54 is a pivoted armature 54' adapted to be swung toward the coil by magnetic attraction. An adjustable spring 54" is provided normally holding said armature away from the coil, the adjustment permitting the armature to be swung at such time as objectionable overload current passes through the coil. Swinging of the armature 54' causes the same to strike the top of rod 53, swing lever 54 and slide plunger 55 upwardly breaking contact of switch plate 56 carried at the upper end of said plunger from contact points 57, 57 which breaks the circuit to the circuit breaker holding coil 12 resulting in the circuit breaker members separating. The plunger 55 is provided with a collar 59 adapted to be retained in elevated position by swinging detent 60 as in the pneumatic relay herewith described. A magnet 61 is provided to operate upon an armature 62 for releasing the detent 60 at which time a spring 63 on the plunger will depress the same and again close the plate 56 against the contact points 57, 57.

By reference to Figure 1, it will be observed that the magnet 61 is in a circuit from the reset switch 19 which necessitates that said switch be swung so its end will engage the contact point 64. At that time current will pass from the main line through fuse 17 and wires 16, pivot point 18 and contact point 64 to a wire 65, resistance 67 and thence to the magnet 61 and to the ground as at 68. It will therefore be seen that when the circuit breaker is opened as a result of an overload, the operator merely swings the reset switch to obtain a current through magnet 61 and depress the armature 62 at which time spring 63 in the relay will cause the plunger to depress and engage contact plate 56 with points 57, 57. This plate and the points form a part of a shunt circuit from the main line through fuse 17 and wire 16 and pivot point 18 of the switch 19, through contact point 20 of said switch and wire 21 which is in series with resistance 69 in turn connected with one of the contact points 57. To complete the circuit to that point, it will be observed that lever 19, after having been swung to engage point 64 will again have to be returned to engage point 20 at which position it remains during the normal operation of the system. With the switch plate 56 closed against contact points 57, 57 the current will thereupon pass through a suitable connection 70 to one of the contact points 27 of the pneumatic relay, which, when the plate 26 is closed against its contacts passes the current to the other contact point 27 and through suitable connection 71 to the circuit breaker or holding coil 12. It will therefore be seen that when either the overload relay or the pneumatic relay are operated to open the circuit, it is the one circuit to the circuit breaker holding coil which is opened, and therefore it is impossible to obtain current to the motor until the particular relay which was opened has again been closed.

While the invention has been more particularly described in connection with its application to railway vehicles, it is to be understood that the invention may be used in connection with any operating device which employs a motor for operating the same and a brake for stopping it. Furthermore, detail changes and modifications may be made in the construction and use of the invention, and we do not wish to be understood as limiting ourselves except as required by the following claims when construed in the light of the prior art.

Having thus described our invention, we claim:

1. In an apparatus of the character described, means for automatically preventing current being supplied to a motor during application of brakes interfering with free operation of said motor, and electrical means for automatically permitting current to be applied to said motor as the control is turned on after the brake is released.

2. In a device of the character described, a brake, a pneumatic relay, means connecting the brake and relay for opening the relay upon application of a brake, and means for closing the relay when the brake is released.

3. In a device of the character described, a circuit breaker in a power transmitting circuit, a shunt circuit for operating said circuit breaker, a relay controlling said shunt circuit, adapted to be automatically opened by conditions adverse to the utilization of the current in the main line circuit, and means for closing said shunt circuit after the adverse conditions have been overcome.

4. In an apparatus of the character described, a circuit breaker in a power transmitting circuit, electrical means for maintaining said circuit breaker closed, a pneumatic relay operating upon the circuit of said electric control whereby said circuit breaker may be opened by the pneumatic relay.

5. In an apparatus of the character described, a circuit breaker in a main line power transmission circuit, electrically actuated means controlling said circuit breaker, a pneumatic actuated relay controlling the circuit of said electric control, and a pneumatic brake connected with the pneumatic relay whereby application of the brake will operate the relay to operate the electric control to open the circuit brake.

6. In an apparatus of the character described, an electric circuit, a pneumatic relay adapted to open or close said circuit, a brake, and means connecting the brake and relay whereby the relay will open the circuit upon application of the brake.

7. In an apparatus of the character described, an electric circuit in a pneumatic relay adapted to open or close said circuit, a brake, and means connecting the brake and relay whereby the relay will open the circuit upon application of the brake, and an electric control for closing said circuit only upon release of the brake.

8. In an apparatus of the character described, a main line circuit passing through a relay and adapted to open a switch in said relay in a shunt circuit upon passage of an abnormal current through said main line, mechanical means for retaining the switch open, and electrical means for releasing said mechanical means and permitting said switch to close when the abnormal current ceases.

9. In an apparatus of the character described, a combination of a pair of relays both operating to open or close a shunt circuit whereby when either of said relays is open current will not pass through said circuit, and a circuit breaker controlled by said shunt circuit adapted to be opened when either or both of said relays is opened.

10. An apparatus of the character described, comprising a main line circuit, a circuit breaker in said circuit, said circuit breaker having separable contact members, and a holding coil for operating said circuit breaker from a shunt circuit.

11. An apparatus of the character described, a circuit breaker having a fixed member, a movable member, a lever pivotally supporting said movable member, a spring normally drawing the lever downwardly and the movably contact member upwardly with respect thereto, and a holding coil for swinging the lever and movable member against the tension of said spring whereby the contact members may be brought into engagement by passage of current through said coil and may be separated by a wiping movement upon succession of current through the said coil under the influence of said spring.

In testimony whereof we affix our signatures.

HERSHEL A. BENEDICT.
EDVARD M. MOLLER.